C. H. SMITH.
PLANT FOR AND METHOD OF TREATING COAL.
APPLICATION FILED APR. 3, 1918.

1,415,202.

Patented May 9, 1922.
6 SHEETS—SHEET 4.

INVENTOR
Charles Howard Smith
BY
Keddle Thompson
HIS ATTORNEYS

UNITED STATES PATENT OFFICE.

CHARLES HOWARD SMITH, OF SHORT HILLS, NEW JERSEY, ASSIGNOR TO INTERNATIONAL COAL PRODUCTS CORPORATION, OF RICHMOND, VIRGINIA, A CORPORATION OF VIRGINIA.

PLANT FOR AND METHOD OF TREATING COAL.

1,415,202.           Specification of Letters Patent.        Patented May 9, 1922.

Application filed April 3, 1918. Serial No. 226,407.

*To all whom it may concern:*

Be it known that I, CHARLES HOWARD SMITH, a citizen of the United States, and a resident of Short Hills, in the county of Essex and State of New Jersey, have invented certain new and useful Improvements in Plants for and Methods of Treating Coal, of which the following is a specification.

The invention relates to the treating of coal in a manner to ultimately produce from the coal desired solid material products—products comprising solid, as distinguished from liquid, carbonaceous material—and during which treatment of the coal there result vaporous, gaseous and liquid products which when collected or recovered are referred to as by-products.

The invention especially relates to the manufacture of briquets and particularly to a plant for commercially producing the same.

The invention also relates to portions or parts of a plant for performing one or more steps in the treating of coal or in the manufacture of briquets from coal.

The invention also relates to certain methods and apparatus that are employed in and for the production of certain solid material products from coal, and it furthermore relates to methods and apparatus that are employed in the handling of solid material products from coal and in the producing of solid materials from coal.

In my U. S. Patent No. 1,276,429, granted August 20, 1918, entitled "Briquets and method of making the same," there is clearly set forth and described a process for producing low volatile smokeless briquets. According to a method described in said patent coal having a high volatile content is given a preliminary heat treatment. This preliminary heat treatment is a carbonizing or distilling operation and is frequently referred to as an initial preliminary heat treatment. It may also be properly referred to as an initial or preliminary carbonizing operation or as an initial or preliminary distilling operation.

During this preliminary treatment the coal is heated in a manner to distil therefrom a portion of the volatile matter contained therein and in a manner to leave a partially but uniformly distilled residual mass, which is sometimes referred to as a partially distilled coal, but which is more properly referred to as a partially distilled residue or as a partially carbonized residue. This partially distilled residue is cooled, and is rendered in finely-divided form as by pulverizing in a crusher. An admixture of hydrocarbon binding material is mixed with the pulverized material and a fluxing operation is carried out, with the aid of steam. Thereafter the fluxed mixed material is pressed into briquets, frequently termed "raw briquets." The raw briquets are subjected to a subsequent or final heating operation during which the briquets are carbonized or subjected to what may be termed a "second" distilling operation. This second distilling operation may be and is frequently referred to as a final or subsequent distilling operation, or as a final or subsequent carbonizing operation. If the raw briquets thus made contain from approximately eleven per cent (11%) to seventeen per cent (17%) hydrocarbon volatile matter—exclusive of any water which may be added in the making of briquets—they can be heated in a manner to distil off a substantial portion of said volatile matter contained therein and there will result smokeless carbonized briquets, each having a firm, strong, coherent structure. This firm, coherent structure is enabled to be realized due to there being a proper amount of hydrocarbon volatile matter or binding material in the raw briquet and which is sufficient to allow or ensure the development of the cementing properties when a proper heating operation is performed and which proper heating is performed during the final or subsequent carbonizing operation just referred to, as the temperatures at this time are sufficiently high to accomplish this result.

The present invention has in view the employment of certain methods, steps, means, mechanisms, apparatus, parts, devices and the like for the actual and practical performance of the invention described in the aforesaid patent.

The invention has in view the features above referred to and which are hereinafter fully described and clearly set forth in the appended claims.

In the accompanying drawings forming a part of this specification there is illustrated a plant, or at least a portion of a plant, and certain apparatus, parts, mechanisms and devices which enter into the making up of the plant and in which plant or portion thereof the invention that is the subject of the present application can be realized. In said drawings—

Figures 1ᴬ, 1ᴮ and 1ᶜ are vertical views illustrating in sequence and in longitudinal arrangement successive portions of a plant. These three views illustrate the different mechanisms, parts, apparatus and devices through or along which the coal or coal residue passes from the time the coal is received from a car which is shown at the left hand side of Figure 1ᴬ up to the time the briquets are delivered from a furnace shown at the right hand side of Figure 1ᶜ.

Figure 1ᴰ is a vertical view illustrating in sequence and in longitudinal arrangement successive portions of a plant and in this view there is shown a modification which can be employed in place of the construction shown in Figure 1ᴮ.

Figures 2ᴬ, 2ᴮ and 2ᶜ are horizontal views illustrating in sequence and in longitudinal arrangement successive portions of the plant shown in Figures 1ᴬ, 1ᴮ and 1ᶜ.

Figure 2ᴰ is a plan view illustrating in sequence and in longitudinal arrangement successive portions of a plant and in this view there is shown a modification which can be employed in place of the construction shown in Figure 2ᴮ.

In the plant there are two sets of furnace-retorts. One of these sets may be referred to as the initial furnace-retort—this is where the initial distilling or initial carbonizing operation is performed—while the other may be referred to as the final or subsequent furnace-retort—this is where final distilling or final carbonizing operation is performed. The initial furnace-retort may also be referred to as a retort having a mixing and conveying means therein while the final or subsequent furnace-retort may be referred to as the furnace having inclined retorts, and it has therefore, been called the inclined furnace-retort.

Figure 5 taken in conjunction with Figure 3 shows a discharge conduit or passageway leading from the interior of the retort. In Figure 5 there is clearly shown a pair of cooperating, rotary breakers followed by a rotary seal, the latter of which is constructed so that residue from the retort can be passed through the discharge conduit or passageway without allowing the entrance of any substantial amount of air to the interior of the retort. In both Figures 3 and 5 there is also shown a part of an enclosed conveying mechanism arranged to receive material passing to it from said passageway or conduit.

In Figure 6 there is also indicated the position of a charging car when opposite the upper end of the carbonizing chamber and there is also indicated a car arranged to receive briquets discharged from the carbonizing chamber.

In Figure 8 certain dampers for controlling the flow of the incoming air and of the outflow of the products of combustion are indicated adjacent to the openings controlled thereby. These dampers have been purposely omitted from Figures 7, 9 and 11 for the sake of clearness. In the lower portion of Figure 6 there are shown the ducts or conduits along which incoming air flows in a more or less sinuous path on its way to the furnace. In the lower portion of Figure 7 there are also shown the ducts or conduits through which the products of combustion pass from the furnace along a sinuous path to the stack or atmosphere.

In Figures 9, 10 and 11, it will be observed that there is a set of air ducts alternating with a set of waste gas ducts and the result of this construction is a recuperator wherein there is an exchange of heat from the hot outgoing gases to the incoming air that is utilized in the supporting of combustion that takes place in the combustion flues. This recuperator is shown in cross-section in the lower portion of Figures 9, 10 and 11.

The description of the plant wherein briquets are made from raw coal is as follows:

The plan is provided with a storage or storage bin 1 upon which the coal from a car is emptied, where it forms a pile or heap of coal, as 2. The coal from the pile 2 is conveyed in any suitable manner, as by means of an endless conveyer 3, to a crusher 4, wherein the coal is crushed or pulverized, or, in other words, rendered in a granular or finely-divided form. The crushed coal is then conveyed in any suitable manner, as by endless conveyer, to wit a bucket elevator, 5, from the crusher 4 to a position where it is delivered into a storage bin or hopper 6. This bin 6 may be referred to herein as the raw coal bin. It is the bin, as is apparent from what has preceded, wherein certain raw coal in finely-divided form is received. From this bin 6 the finely-divided coal is conveyed in any suitable manner, as by means of lorry cars 7, to a position where it can be delivered into desired hoppers, as 8, constituting a part of an automatic feeding means 9 for the double paddle furnace-retorts 10.

Figure 3:
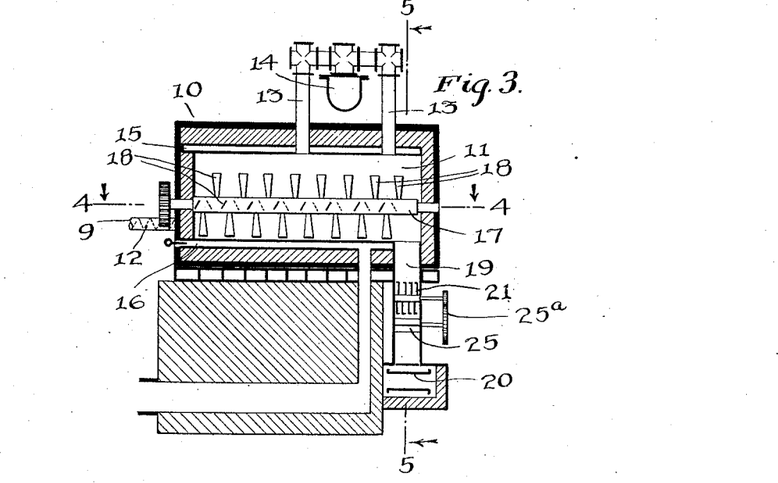
Figure 3 is a vertical but longitudinally, extending sectional view of the initial furnace-retort showing a shaft and paddles thereon constituting a part of the mechanism for effecting a mixing and conveying of the charge within the retort. This figure is a view taken as on a plane indicated by the line 3—3 of Figure 1ᴬ, 2ᴬ, 4 or 5.
Figure 4:
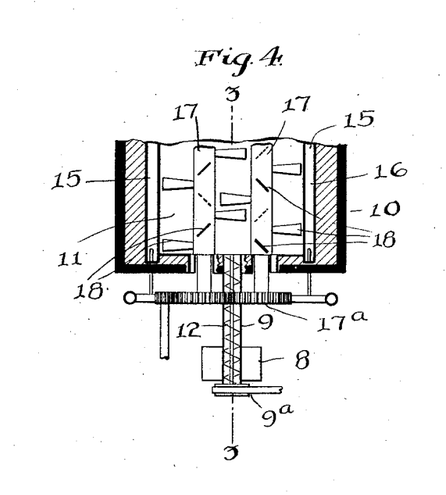
Figure 4 is a partial end view—in horizontal section—of the initial furnace-retort showing end portions of companion shafts and paddles thereupon, and which shafts and paddles constitute a part of the mixing and conveying mechanism within the retort arranged so that the paddles of one shaft overlap the paddles of a companion shaft. There is also clearly indicated the feeding means whereby coal is fed to the interior of the retort. This is a view taken as on the plane indicated by the line 4—4 of Figure 1ᴬ or Figure 3 looking in the direction of the arrows.
Figure 5:
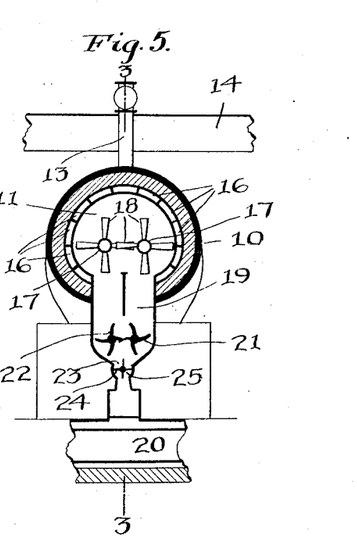
Figure 5 is a vertical transverse sectional view taken as on the plane indicated by the line 5—5 of Figure 2ᴬ or Figure 3 looking in the direction of the arrows.

A more or less detail construction of these furnace-retorts 10 is shown herein in Figures 3, 4 and 5, and a still further detail construction thereof will be found in my co-pending United States application Serial No. 217,764 filed February 18, 1918, entitled "Furnace-retorts," and furnace-retorts the same as shown and described in said co-pending application can be employed to perform the function of the furnace-retorts 10. It will be understood, however, that other forms of furnace-retorts can be employed from that shown herein or from that shown in my co-pending United States application Serial No. 217,764, for example, there might be employed a furnace-retort such as is shown in my copending United States application Serial No. 233,422, filed May 9, 1918, entitled "Furnace-retorts."

These furnace-retorts 10 have been so-called because they each comprise a combined retort and furnace therefor. Each retort which is designated by 11 is substantially air-tight. The feeding means 9 is constructed so that the powdered coal to be treated in the retort is automatically fed into the retort as by means of a screw-conveyer 12 constructed so as to feed the coal as desired without permitting the entrance of air into the retort by the feeding operation. Piping 13 leads from the interior upper portion of each retort to a hydraulic main 14 that serves to receive and convey the vaporous, gaseous and liquid products which are distilled from coal within the retort. Each retort 11 is heated by means of its corresponding furnace 15 constructed so as to provide heating flues 16 about the exterior of the retort, within which flues combustion takes place or along which flues products of combustion flow in a manner to supply the heat requisite for performing the desired distilling operation within the retort.

Each retort 11 is provided with mixing and conveying mechanism in the form of parallel shafts 17, having thereupon paddles 18 arranged so that as a shaft rotates the paddles on one shaft overlap paddles on the companion shaft. These paddles are shaped—or in other words sloped—relative to the axis of the shaft in such a manner that they not only mix or agitate the material or charge within the retort but also progressively convey the material along the retort from the charging end of the retort to the discharging end thereof. It will here be noted that each of the retorts is what may be referred to as a horizontally-extending retort, that the coal is charged into the retort at the end thereof, and that it is conveyed by the mixing and conveying means just described to a discharge opening, at the other end of the retort. The shafts 17 are sometimes referred to as companion shafts having overlapping paddles thereupon and these shafts are parallel with each other and extend longitudinally along the interior portion of the retort.

When the treated coal—or properly speaking the partially distilled residue—reaches the discharging end of the retort, it passes through the discharge conduit or opening 19, sealed against the entrance of air by the movable rotary seal 25, to an enclosed conveying means 20. In the discharge opening or conduit 19 there is located a pair of rotary members 21 and 22 having spaced rotating arms arranged so that the arms of one rotary member cooperate with the arms of the other rotary member. These rotary members serve two functions; (a) that of breaking up large chunks of residue that may be passing through the discharge opening or conduit 19 and (b) the forcing of the broken up residue or residual mass into pockets 23 provided between arms 24 of the rotary seal 25. This rotary seal 25 serves to seal the retort 11—which is an air-tight retort—against the entrance of air and also serves to convey the broken-up residue to the enclosed conveying means 20. The furnace-retort is provided with suitable power-operated mechanisms for operating the screw-feeding means 9, whereby the coal to be treated can be continuously and automatically fed to the interior of the retort, for driving the shafts carrying the paddles that are within the retort proper, whereby the shafts and paddles will be continuously rotated and will, therefore, constantly agitate the coal within the retort and will progressively feed the coal along the retort from the charging end of the retort to the discharging end thereof, and for operating the rotary members 21 and 22 and the rotary seal 25 associated therewith, whereby the rotary members will perform the function of breaking up large masses of coal residue leaving the retort and will convey the broken residue to the rotary seal, and whereby the rotary seal will ensure a passing of the residue through the discharge opening or conduit without allowing the entrance of any substantial amount of air to the interior of the retort.

The power-operating mechanisms just referred to may all be operated from different sources of power, that is, there may be one mechanism indicated as by 9ª for the screw-feeding means 9, another indicated as by 17ª for the paddle-carrying shafts, and another indicated as by 25ª for the rotary members 21 and 22 and rotary seal 25 associated therewith. The hydraulic main 14 has preferably connected thereto an exhauster 26, which can be relied upon to reduce the pressure within the retort and to withdraw gases and vapors from the retort as they are given off by the coal.

The enclosed conveying means 20 conveys the coal residue discharged from the furnace—which residue is a partially but uniformly distilled residue and is in a heated condition—to a cooler 27. This cooler may be of any suitable construction to perform its function. In the form shown there is a tank or trough 31—preferably enclosed at the top—into which the heated residue from the conveying means 20 is discharged. In this tank or trough there is a mixing and conveying means, as 28, in the form of rotating parallel shafts carrying paddles 29 and arranged so that the paddles of one shaft overlap the paddles of the companion shaft, as the shafts are rotated. The paddles are shaped and constructed so as to convey the residue toward the discharge end of the cooler. Quenching fluid, especially water, is supplied to the tank, viz. directly to the residue in the tank, for cooling purposes, as by valve-controlled pipe 30.

The water-cooled residue, which in fact is a moist or damp quenched residue, as discharged from the cooler 27—or quencher as the latter may be and in practice frequently is termed—passes into a conveyer 32 which elevates the quenched residue to a position where it is delivered into a storage bin or hopper 33, which may be referred to as the partially-distilled residue holder. At the lower end of this holder there is a hand-operated slide 34, which can be moved to an open position when it is desired to let some of the water-cooled residue pass on to a conveyer 35 serving to conduct the material of the residue to a crusher 36. There are associated with the construction just referred to, to wit, with the storage bin or hopper 33, conveyer 35 and crusher 36, a pitch cracker 37, chute or conveyer 38, and conveyer 39. The pitch cracker serves, as its name implies, to break up or crack pitch that is to be used in the manufacture of final briquets. This pitch passes along the chute or conveyer 38 to the conveyer 39, where it drops upon the cooled residue that is being fed to the crusher by the conveyer 35.

The mechanism and parts just described may be referred to as the proportioning mechanism, since the function of the associated conveyers which are between the storage bin or hopper 32, the pitch cracker 37 and the crusher 36 is to supply the partially carbonized residue with the proper proportion of pitch that is requisite for the proper manufacture of the final desired briquet, as will hereafter more fully appear. The partially carbonized residue which enters the crusher 36 has therewith the pitch, as has been described, and this pitch may be referred to as an admixture of binding material supplied to the partially distilled residue. In the crusher 36 the partially distilled residue is broken up or crushed so that it is in a pulverized condition, or, in other words is in finely-divided form. It will here be remarked that in the retort 11 the coal is subjected to a uniform and progressive heating under such a condition that the coal is uniformly distilled and there results from the initial distillation carried out in this retort a uniformly and partially distilled residue due to the initial distillation in the retort wherein cell structures are developed owing to the cementing of the grains of the powdered or crushed coal into an agglomerate granular structure and the volatilization of certain volatile matter contained therein.

The partially distilled residue leaving the retort is, therefore, in the form of agglomerate pieces having cells or voids defined by cell structures formed by cemented-together small particles. This partially distilled residue is in a condition more or less spongy in appearance and when cold is friable and readily crumbles. The masses or pieces of partially distilled coal or coal residue are broken up as just indicated in finely-divided or pulverized condition with the consequent result that the several cell structures are broken up. This pulverizing operation is readily effected because of the more or less friable or fragile structure of the cooled residue which enters the crusher. The product from the crusher is, therefore, composed of partially carbonized residues in finely-divided form, in which residues the cell structure has been broken up. There is also mixed therewith the pitch which was supplied in the manner just described, and the pitch is also broken up in the crusher, provided it was in a form for the crusher to operate upon it to perform this function.

The material from the crusher is elevated by a conveyer 40 to a position where it is delivered into a mixer and fluxer 41. This mixer and fluxer is in the form of a container 42, preferably enclosed, which container is supplied with steam as through a valve-controlled pipe 43. This mixer and fluxer has a driven rotating shaft 44 having thereupon rotating arms or paddles 45. This container may also be provided with stationary arms 46 to ensure a better and more uniform mixing and fluxing of the material therein. The fluxing and mixing operation just referred to produces what is sometimes referred to as a "mash" and the word "mash" as used herein is employed to designate a mass of powdered or finely-divided coal or partially distilled coal having intermixed therewith water or hydrocarbon volatile matter in liquid or plastic form whereby there results a soft mixture of plastic mixture that can be readily molded into briquets. The mixture or mash is conducted from the mixer and fluxer 41 through a tempering apparatus 47 into a rotary briquetting press 48. The function of this tempering apparatus 47 is to control the condition of the mixture that is to be fed into the press 48. That is if the mixture is found to be too dry, water may be added thereto either in a cold liquid state or in the form of steam. The tempering apparatus, therefore, as indicated, is in the form of a tank or trough 47$^a$, having therein mixing and conveying means, as in the form of parallel shafts 47$^b$ carrying paddles 47$^c$. This mixing and conveying means is similar in function and mode of operation to the mixing and conveying means employed in the initial distilling retort and also to the mixing and conveying means employed in the cooler 27. Water or steam, whichever it is desired to employ, is fed to the tempering apparatus, as through a valve-controlled pipe 47$^d$. The briquetting press 48 has cooperating rotary driven die members 49 and 50 with the several notches 49' and 50' therein, whereby, when two notches are close to each other, they form a mold or die 51, wherein a briquet is pressed and molded into the desired shape. By continuously feeding the mash to such a press there is obtained a continued series of pressed briquets which are herein termed raw briquets. From the press the raw briquets are carried by means of a conveyer 52 to a briquet storage bin or hopper 53, which bin or hopper may be referred to as the raw briquet storage bin. The opening of the gate 54 allows the raw briquets to enter a lorry car 55 that serves to convey the briquets to a position where they can be charged in bulk into the upper end 56 of carbonizing chambers 57 of the inclined furnace 58, when doors 59 at said end are open. Each of these carbonizing chambers is divided by shelves or partitions 60 into compartments or spaces 61, 62, 63 and 64, one above the other. These shelves or partitions 60 slope downwardly and rearwardly, whereby there is a tendency for the charged raw briquets to seek the lower portions of the carbonizing chamber. The carbonized briquets remain in this chamber until the proper carbonizing operation has been performed, after which the doors 65 at the lower end of the carbonizing chambers are opened, allowing the carbonized briquets to enter the car 66 for conveying the carbonized briquets to the place desired. The carbonized briquets, however, are cooled shortly after leaving the carbonizing chamber by a water supply means 67 that serves to quench the briquets that are within the car.

Figure 6:
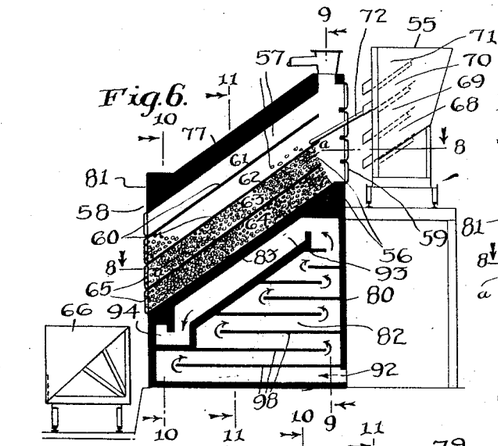
Figure 6 is a vertical longitudinal sectional view of an inclined furnace-retort showing a carbonizing chamber. In this view there is shown in vertical longitudinal section an inclined carbonizing chamber which carbonizing chamber is sub-divided by shelves or partitions into carbonizing compartments or spaces, one above the other. This is a view taken as on the plane indicated by the line 6—6 of Figures 1ᶜ, 8, 9, 10 and 11 looking in the direction of the arrows.
Figure 7:
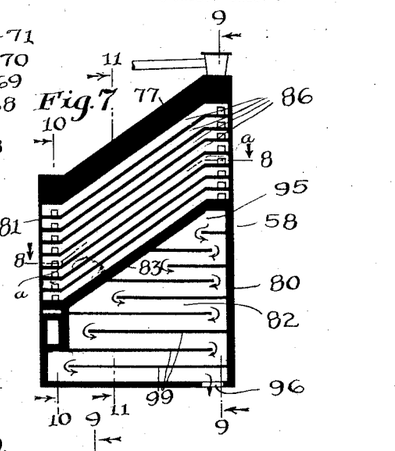
Figure 7 is a vertical longitudinal sectional view of the inclined furnace-retort. This is a view taken through the heating flues of the furnace portion of the furnace-retort, and is a view taken as on the planes indicated by the lines 7—7 of Figures 8, 9, 10 and 11.

In Figure 6 the briquets are shown in the position which they occupy in the carbonizing compartments or spaces 63 and 64 when a carbonizing operation is being performed. In Figure 6 the parts are shown in the position which they occupy when carbonizing compartment or space 62 is being filled with the raw briquets that are to be carbonized. It will be observed that the lorry car 55 is divided into compartments, as 68, 69, 70 and 71, which contain enough raw briquets to properly fill each carbonizing compartment and from any one compartment of the lorry car to a corresponding compartment within the chamber there is provided a movable or telescoping chute, as 72, which serves to conduct the raw briquets as from the compartment 70 of the car to the carbonizing compartment 62 of the furnace. When the carbonizing operation is proceeding, the doors 59 and 65 are, of course, closed and the retort of the inclined furnace retort 58, which retort includes the carbonizing chamber 57, is closed. The raw briquets are charged into the carbonizing compartments when the latter are in heated condition, as will hereinafter more fully appear. The construction of this inclined furnace shown in Figures 6 to 11, inclusive, will also be described hereinafter somewhat more in detail.

Figure 1A:
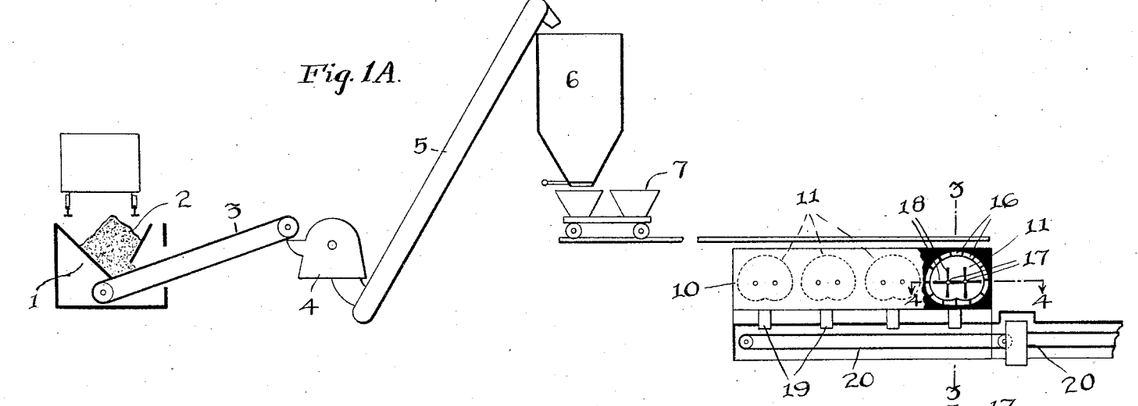
Figures 1B, 2B:
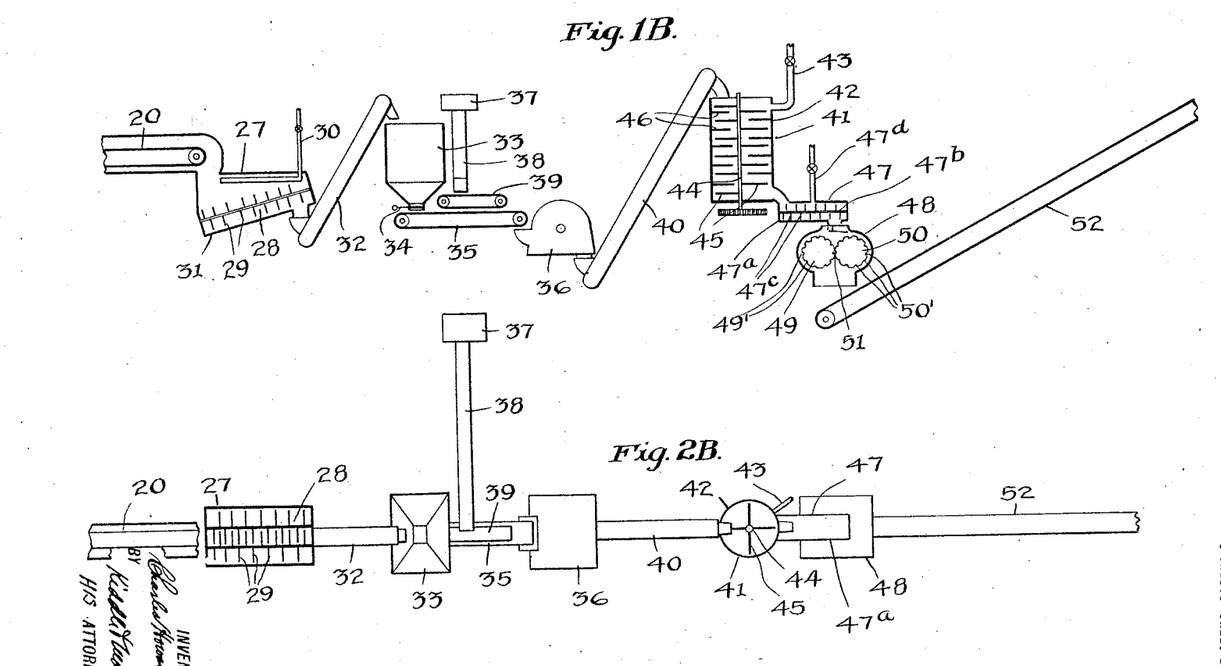
Figure 1C:
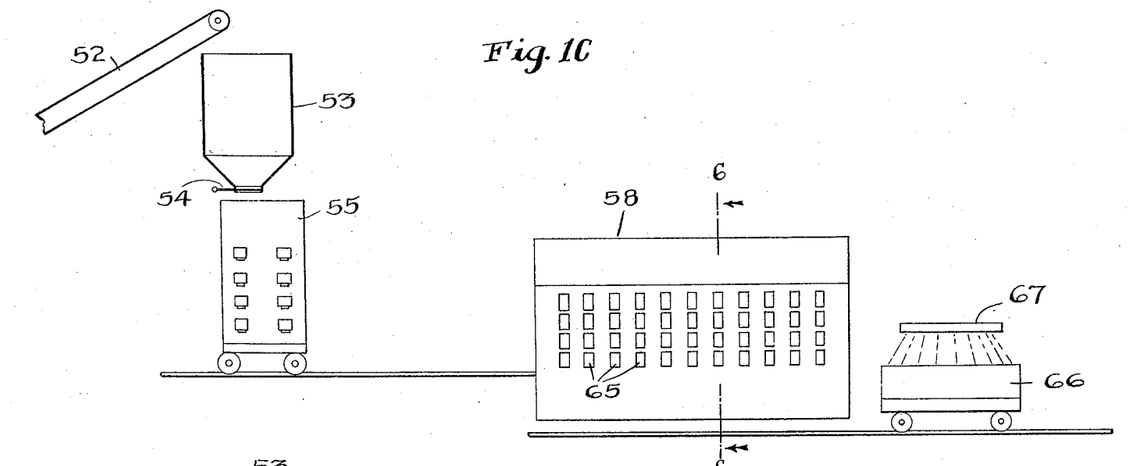
Figure 1D:
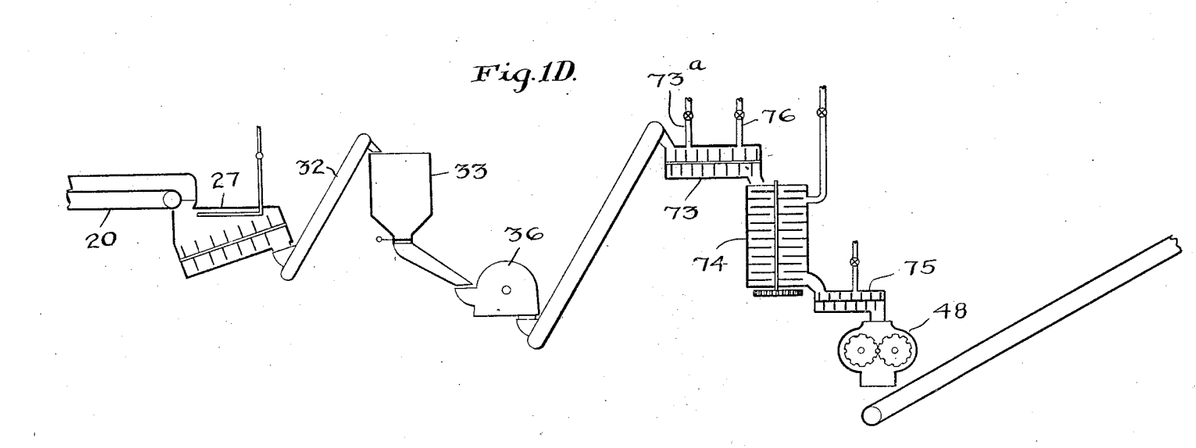
Figure 2A:
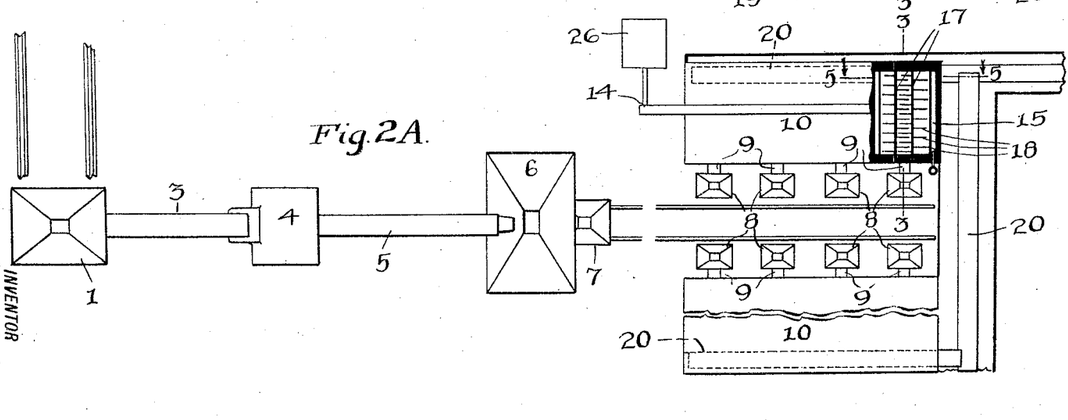
Figure 2C:
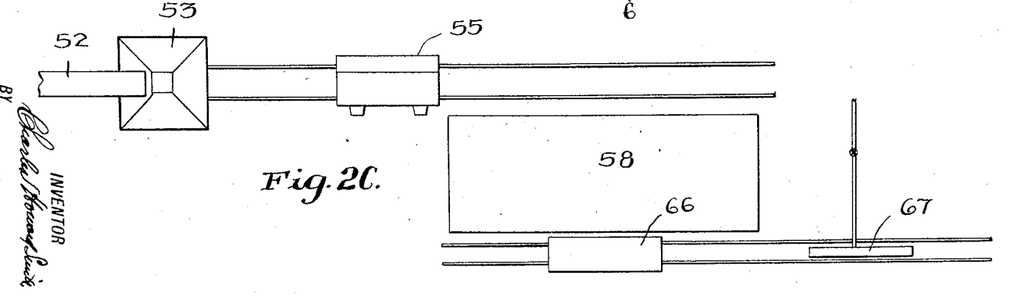
Figure 2D:
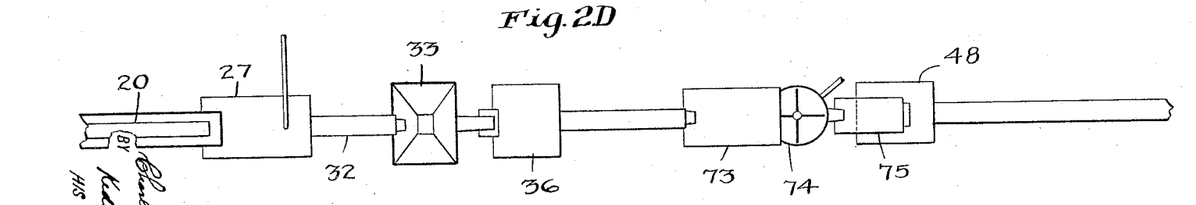

Reference will now be made to the construction or arrangement shown in Figures 1$^D$ and 2$^D$. According to the construction shown in 1$^B$, the pitch for providing the hydrocarbon binding material which is generally employed in making the desired briquets is added when cold or in a solid form—in contradistinction to a liquid form—to the cooled residue prior to the latter passing to and through the crusher 36.

In said Figures 1$^D$ and 2$^D$ there is contemplated an arrangement wherein the hydrocarbon binding material that is usually employed is supplied to the pulverized or finely-divided residue after it leaves the crusher and with such an arrangement a pitch cracker and its function is rendered unnecessary.

According to the arrangement of Figures 1$^D$ and 2$^D$, the uniform but partially distilled residue is carried from the cooler or quencher 27 by the conveyer 32 to the storage bin 33, from whence it is carried to the crusher 36 and the finely-divided coal is conveyed to a mixer 73. Into this mixer hot pitch or other liquid hydrocarbon is fed in liquid form to the pulverized material as by 73$^a$, and therein the pulverized material and the admixture are intimately, thoroughly and uniformly mixed. The mixed materials are passed to a fluxer 74 which has the function of still further mixing and of supplying steam in order that there may result a desired mash. The fluxer is similar to the fluxer 41 previously described, and from the fluxer the mash passes to tempering apparatus 75 similar to the tempering apparatus 47 previously described.

The mash finally passes to the briquetting press 48 from whence the raw briquets are conveyed to the inclined carbonizing chamber wherein the carbonizing operation is performed. Steam can be supplied for heating the material in the mixer 73, wherein a more uniform heating can be realized, if desired; or water could be supplied to facilitate the mixing therein, if desired. A piping for this purpose is indicated by the hand-controlled pipe 76.

Reference is again made to the inclined furnace-retort shown in Figures 6 to 10, inclusive. Each inclined furnace retort comprises several carbonizing chambers 57, each of which carbonizing chambers has carbonizing compartments 61, 62, 63 and 64 arranged one above the other. The roof 77 of the furnace-retort as a whole defines the roof portion of each carbonizing chamber 57, said roof of the furnace extending horizontally from side wall 78 of the furnace to side wall 79 and rearwardly and downwardly from the end wall portion 80 to the end wall portion 81 of the furnace. In the lower portion of each furnace-retort there is a recuperator, as 82, the function of which is to cause a transmission of heat in a manner to heat incoming air and to cool outgoing gases. The recuperator is separated from the carbonizing portion of the furnace retort by a main floor member 83 which extends horizontally from side wall 78 to side wall 79 and which is inclined rearwardly and downwardly from the end wall 80 to the end wall 81. The carbonizing chambers 57 are defined between vertically and longitudinally extending intermediate partitions 84 which extend from end wall to end wall and from the main floor member 83 to the roof 77. These carbonizing chambers 57 are located between combustion chambers 85 and the combustion chambers are located as between a side wall 78 and an intermediate partition 84, and as between intermediate partitions 84. The combustion chambers are subdivided into combustion flues 86 arranged one above the other, as will be apparent from an inspection of Figure 7. Each of the combustion flues receives hot air, as from passageway 87, through the damper-controlled opening or passageway 88, and fuel may be supplied to each combustion flue as through valve-controlled pipe 89. The products of combustion or spent gases pass from the combustion flues 86 as through damper-controlled opening or passageway 90 to conduit, duct or passageways 91 on their way from the furnace.

By the construction just described accurate control of the heat conditions within each carbonizing compartment is readily attained. The air enters the recuperator at 92, flows through the sinuous path indicated by the arrows in Figure 6 until it reaches the conduit 93 that is below the main floor member 83, from whence it passes into a transversely-extending header opening or main passageway 94, where it can flow upwardly through open passageways or conduits 87 into the several combustion flues 86. The products of combustion pass through the damper-controlled opening or passageway 90 and the vertically-extending ducts or conduits 91 into the conduit or passageway 95 where they take the sinuous path indicated by the arrows in Figure 7 from the recuperator 82 out through the opening 96 on their way to the stack or atmosphere. It will therefore be seen that the outgoing hot gases travel in a direction opposite to the incoming cold air and, therefore, the air can attain the maximum temperature which can be imparted to it through the partition walls or intermediate members 97 that extend vertically from the foundation of the furnace retort to the main floor member 83 and that extend from the wall at one end of the furnace to the wall at the other end thereof. The sinuous paths for the incoming air and outgoing gases are, respectively, defined in part by horizontally-extending partitions, as 98 and 99, which partitions connect vertically-extending intermediate members 97 to each other and to the side walls of the furnace, thus serving to brace the vertically-extending intermediate partitions from the side walls.

Figures 8, 9, 10, 11:
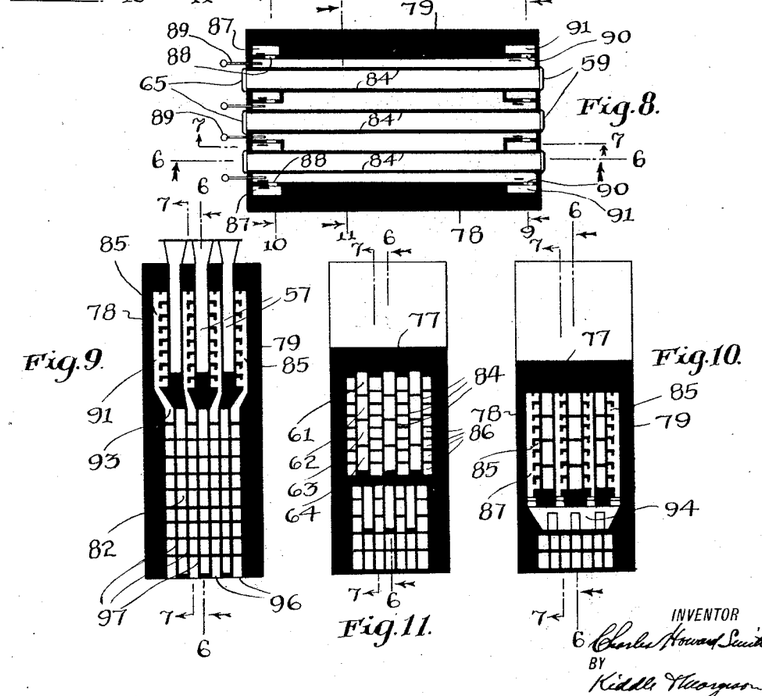
Figure 8 is a view taken as on the planes indicated by the broken lines 8—*a*—*a*—8 of Figures 6 and 7 looking in the direction of the arrows.
Figure 9 is a vertical transverse sectional view taken as on the plane indicated by the line 9—9 of Figures 6, 7 and 8 looking in the direction of the arrows.
Figure 10 is a vertical transverse sectional view taken as on the plane indicated by the lines 10—10 of Figures 6, 7 and 8 looking in the direction of the arrows.
Figure 11 is a vertical transverse sectional view taken as on the plane indicated by the lines 11—11 of Figures 6, 7 and 8 looking in the direction of the arrows.

An inspection of Figure 11 will make it clear that all parts of the furnace are well braced and connected, whereby the furnace retort will withstand continued and hard usage to which a furnace of this type must necessarily be subjected.

It will be readily understood from an inspection of the drawings that any number of carbonizing compartments could be provided in an inclined furnace or in a battery of inclined furnaces dependent on the desire of a designer and upon the amount of work to be performed in any particular plant.

It will be noted that the initial furnace-retort as shown in Figures 3, 4 and 5 and the final or subsequent retorts of Figures 6 to 10 inclusive (sometimes referred to as the secondary and sometimes as the inclined retorts) are each described at considerable length in this specification, this in order that this case may be complete as a whole. The primary retorts suitable for this work have been made and are the basis of application for Letters Patent in United States numbered 217,764 and 233,422 while the secondary retorts have become the subject of application for Letters Patent in United States numbered 226,410. It is not the intention in this case to claim either of these retorts subsequently as instrumentalities per se, as this is being taken care of in the companion cases on file, such as are herein identified.

Referring again to the plant as a whole wherein briquets are made from raw coal, and particularly to Figures 1^A to 1^D inclusive, it will be noted that there are continuous series of mechanisms or apparatuses for conducting the material to and from the several places desired, and in many respects these mechanisms may be referred to broadly as conveying means or mechanisms for conveying, conducting, carrying, guiding or passing material from one place to another, even though the material is interrupted somewhere in its passageway, in order to have some operation, process, step or the like carried out.

As showing, however, the manner in which the several parts of the plant are brought into operative combination and can be employed there is herein described a specific method of making briquets from raw coal.

In the making of such briquets the raw coal is treated so as to form an intermediate product which has a partially distilled residue in a particular form, and the first portion of the plant is particularly adapted for the making of this intermediate product. The plant is particularly designed and particularly useful in the making of briquets from coal wherein it is desired to first form the coal into the intermediate product above referred to and then to make raw briquets from this intermediate product as herein described, and, as has been heretofore pointed out, the plant herein described is particularly useful in performing the invention set forth in my United States Patent No. 1,276,429, previously referred to.

To exemplify the manner in which coal can be treated in the plant above described, the coal in the pile 2 will be considered to be a soft or bituminous coal having 36% volatile matter and 55% fixed carbon, and the following is a description of how this coal can be treated and formed into a smokeless, free-burning briquet having a strong, coherent structure, and containing as low as $2\frac{1}{2}\%$ or even lower of volatile matter.

It will be understood, however, that raw coals having other characteristics can be employed. It will also be understood that the plant is not limited to the performing of the particular method herein described in detail, but that said method is thus described in order to more clearly illustrate one manner in which the different parts of the plant may be brought into operative relationship in the commercial manufacture of some particular product.

The coal from the pile or heap 2 is passed to the crusher 4, where it is pulverized or rendered in finely-divided form, and thereafter it is passed to the storage bin or hopper 6, from whence the desired amount of crushed or pulverized coal can be passed to the hopper 8, wherefrom it is conveyed or fed to the interior of the retorts 11. The coal or charge is subjected to an initial distillation or partial carbonizing operation within the retorts. During the initial distillation, the heating of the coal within the retorts is carried for the desired period progressively upward until a maximum temperature, varying approximately from 825 degrees F. to 1200 degrees F. is reached, during which heating moisture and tar-bearing products are largely removed in vaporous and gaseous forms; in fact, all products which volatilize or gasify at the temperatures enumerated during said period pass off from the retorts to the hydraulic main. During said heating the coal being treated or charged within the retort is constantly mixed or agitated by the mixing and conveying means 17, which comprises the parallel shafts with paddles thereupon and the charge within the retort is progressively conveyed toward the discharge opening or passageway 19 leading from the retort.

The apparatus is so timed and operated and the temperature is so regulated that when any particular portion of the coal within the retort reaches the discharge opening or passageway leading from the retort, it will have reached the required condition; in other words, the coal being treated will not reach the discharge opening or passageway until the desired amount of volatile matter has been removed from that particular portion of the coal but the coal residue will reach the desired condition by the time it reaches the discharge opening or passageway.

The resulting residue or partially carbonized coal which leaves the retort is in a dry, soft condition and contains, for example, from five per cent. (5%) to fourteen per cent. (14%) of volatile matter, the latter being dependent to a considerable extent upon the particular type of residue desired. This residue is uniform in character as far as distillation is concerned, and may be referred to as a partially but uniformly distilled residue. This resulting residue may be described as being dry, soft, and of a spongy nature, the latter because of the cellular structure developed during the heating in the retort 11. The coal residue passes from the retorts through the sealed openings in the manner heretofore described in connection with that portion of the apparatus relating to the description of the furnace-retorts shown in Figures 3, 4 and 5.

The residue is conveyed through an enclosed conveyor which prevents any part thereof being consumed, as might result if the residue were exposed to the air, and the residue is caused to enter the cooler 27 where water can be supplied to the partially carbonized residue for direct cooling or quenching purposes, as through pipe 30, if desired. In order to facilitate the water contacting with all parts of the partially carbonized residue, the mixing and conveying means 28 can be relied upon to mix the material and also to convey the material along the cooler.

As previously pointed out, the material within each retort 11 is heated to approximately 825 degrees F. and in some instances to as high as 1200 degrees F. The material or partially carbonized residue leaving the retort is therefore relatively hot but it starts to cool immediately upon leaving the heating zone of the retort and by the time the crusher 36 is reached, will be cooled to quite a considerable extent. The water which is applied directly to the partially carbonized residue, as by means of the piping 30, is relied upon to enhance or further the cooling beyond that which would take place if the water were not thus applied. It will be appreciated that some of the water, if not all —in liquid form if applied in that form—is readily converted into the form of steam. Whether in the form of liquid or steam, it serves to cool the partially carbonized residue as it is caused to contact with all parts of the same being assisted by the mixing and conveying means 28 functioning in the manner just described, and it will be readily appreciated that, due to the direct application of the water—in whatever form applied— the residue becomes moist or damp, and as no steps are employed to limit the moisture added by this process, it will be manifest that the material when stored is damp or moist and also when crushed. The cooled residue is then passed to the storage bin or hopper 33 and subsequently to the crusher 36 where the residue can be crushed or pulverized,—that is rendered in finely-divided form. The residue, when it passes through crusher 36, readily crumbles or takes on a granular form, and the product resulting from the crusher 36 shows small grains with portions, that formerly defined cells, on the surface of the grain; in other words, the cell-defining structure provides a part of the surface of the granular particles. This is sometimes referred to as the intermediate product.

There is herein shown the apparatus whereby briquets are made by the employment of this intermediate product and when briquets are to be made an admixture of binding material is usually supplied to the intermediate product.

According to the arrangement shown in Figure 1B, this hydrocarbon binding material is provided in the form of pitch, which is added to the cooled partially but uniformly distilled residue prior to the residue passing to and through the crusher. A predetermined amount of pitch is added, so that there will be the proper amount of pitch to ensure or permit the development of certain cementing properties desired in the final briquet, and when the pitch is added prior to crushing it will be manifest that the product derived from the crusher will not only be the intermediate product just referred to, but there will be mixed therewith the admixture of hydrocarbon binding material, to wit, an admixture of pitch in finely-divided form. The intermediate product and the admixture are then conveyed to the mixer and fluxer, where an intimate mixing of the solid particles of the intermediate product and of the hydrocarbon admixture is attained. Steam is supplied to the fluxer and assists or enables the formation of a plastic mass, or mash as it is sometimes called, and this mass is tempered in a tempering apparatus 47, from which it passes to the briquetting press 48 and is formed into raw briquets having the desired shape and size.

Assuming that the raw briquets have approximately fourteen per cent. (14%) volatile matter therein, exclusive of any water which may have been added in the forming of the steam, these briquets can be readily carbonized in the inclined furnace shown in Figures 6 to 11 inclusive. The raw briquets are conveyed from the briquetting press 48 in any suitable manner, as by conveyer 52, to a storage bin or hopper 53, from which they are conveyed by means of a car to a position where they can be charged into the carbonizing compartments 65 of the inclined furnace 58. In these compartments 65 the briquets are heated to a temperature of from 1400 degrees F. upwardly (preferably to 1850 degrees F.), during which heating the volatile constitutents of the material in the briquet are removed and pass from the furnace through the pipe leading from the carbonizing chamber. During this heating the cementing properties are developed, or, in other words, a general coherence takes place and the briquets are finally discharged from the oven into a receiving car 66, wherein they are suitably cooled, as by the water-cooling means 67. The final carbonized briquets are of the same general shape as the raw briquets charged into the inclined furnace, but they are smaller than the raw briquets originally charged. The final briquets are, as has been previously indicated, of strong coherent structure, are free-burning under normal drafts, and are similar in many of their burning characteristics to anthracite coal.

According to the process just described, it will be observed that the raw briquets were made of partially carbonized coal to which an admixture of binding material had been added, prior to the crushing of the carbonized coal.

In the arrangement of the apparatus shown in Figure 1$^D$, the hydrocarbon binding material was added after the partially carbonized coal had passed from the crusher 36, but prior to the crushed coal entering the fluxer 74.

The plant as illustrated and described herein is particularly useful, as has been previously indicated, in commercially and practically performing the invention embodied in the aforesaid Patent No. 1,276,429.

The improvements herein set forth are not limited to the precise construction and arrangement shown and described, for they may be embodied in various forms and modifications without departing from the spirit and scope of the invention.

What I claim is:

1. A process of making briquets, consisting in agitating the coal and conveying it through a retort, by means of rotary paddles which overlap and rotate in opposite directions, under progressive heating of the retort at temperatures of about 825 degrees F. to 1200 degrees F., until obtaining a partially distilled residue, having between five per cent. (5%) to fourteen per cent. (14%) hydrocarbon volatile matter therein and in which cells have been developed due to said treatment, in crushing the residue preferably after a cooling wherein water is applied directly to the residue and mixing and fluxing the crushed residue together with hydrocarbon binding material such as pitch in a fluxer provided with a mixing device and a steam supply, in forming briquets of the fluxed mixture, which fluxed mixture is preferably made so as to contain from eleven per cent. (11%) to seventeen per cent. (17%) volatile matter, in heating said briquets in an inclined retort at temperatures to approximately 1850 degrees F. until they are carbonized, and finally in causing the discharge of the carbonized briquets from the retort and quenching the hot discharged carbonized briquets.

2. A plant for making briquets comprising several horizontal, substantially airtight, furnace retorts, each of which retorts has suitable means for heating the same, means for feeding coal thereinto at one end and means for mixing the coal or charge within the retort and for conveying the charge along the interior of the retort, which mixing and conveying means comprises a pair of parallel shafts having paddles thereupon, and which shafts are geared so that they rotate in opposite directions in respect to each other and are arranged so that the paddles of one shaft overlap the paddles of the companion shaft as they rotate, each furnace retort also having means whereby the residue can be discharged from the retort without allowing the entrance of any substantial amount of air to the interior of the retort, the plant also having crushing means, means for collecting the residue discharged from the several retorts and for conveying it to the crushing means, means for supplying cooling water directly to the residue while on its way to the crusher, means for mixing the crushed, cooled residue and such hydrocarbon binding material as is added thereto and for fluxing the mixed materials, means for conveying the crushed residue from the crushing means to the mixing and fluxing means, means for adding to the crushed residue the hydrocarbon binding material which in the mixing means is mixed with the crushed residue, a briquetting press and means arranged so that the fluxed material is conveyed from the fluxing means to the press for briquetting, several inclined carbonizing chambers for carbonizing therein the briquets made by said press, means for conveying the briquets from the press to a position where they can be charged into the inclined carbonizing chambers, and a quenching device for cooling the carbonized briquets when discharged from the inclined chambers.

3. A plant according to claim 2, wherein there is provided means for supplying water to the fluxed material from the mixing and fluxing apparatus and for mixing the water in the fluxed material in order to temper the same prior to the briquetting of the material in the press.

This specification signed and witnessed this 2nd day of April, A. D. 1918.

CHARLES HOWARD SMITH.

Signed in the presence of—
EDWARD C. BAILLY,
EDWIN A. PACKARD.